(12) United States Patent
Enjoji et al.

(10) Patent No.: US 7,311,987 B2
(45) Date of Patent: Dec. 25, 2007

(54) FUEL CELL AND A TEMPERATURE CONTROL SYSTEM FOR THE FUEL CELL

(75) Inventors: Naoyuki Enjoji, Saitama (JP);
Yoshinori Wariishi, Saitama (JP);
Kazuya Sasamoto, Saitama (JP);
Yuichiro Kosaka, Saitama (JP)

(73) Assignee: Honda Motor Co., Ltd. (JP)

( * ) Notice: Subject to any disclaimer, the term of this patent is extended or adjusted under 35 U.S.C. 154(b) by 594 days.

(21) Appl. No.: 10/864,702

(22) Filed: Jun. 9, 2004

(65) Prior Publication Data
US 2005/0003253 A1 Jan. 6, 2005

(30) Foreign Application Priority Data
Jun. 11, 2003 (JP) .............................. 2003-166053

(51) Int. Cl.
*H01M 8/12* (2006.01)
(52) U.S. Cl. .............................. 429/26; 429/24; 429/38
(58) Field of Classification Search .................. 429/26, 429/34, 38, 20, 24
See application file for complete search history.

(56) References Cited

U.S. PATENT DOCUMENTS
2005/0003253 A1* 1/2005 Enjoji et al. .................. 429/26

FOREIGN PATENT DOCUMENTS
JP 05-121083 5/1993
JP 11-214017 8/1999

* cited by examiner

*Primary Examiner*—Raymond Alejandro
(74) *Attorney, Agent, or Firm*—Fish & Richardson P.C.

(57) ABSTRACT

A heat medium passage for controlling the temperature of the electric power generation section is separated from the electric power generation section of a fuel cell including a plurality of separators and electric power generating elements alternately laminated in a lamination direction. A heat plate exchanges heat with at least one of the heat medium passage and a heat medium in the heat medium passage and is connected to the separators to provide electrical conduction between the separators in the lamination direction. An electrical insulator is provided for insulation between the heat medium and the heat plate. Another heat medium passage may be provided on the other side. A temperature control system for the fuel cell may include a burner for supplying the heated heat medium to the heat medium passage and may comprise first and second fluidic passages independently to selectively use the first and second fluidic passage.

11 Claims, 11 Drawing Sheets

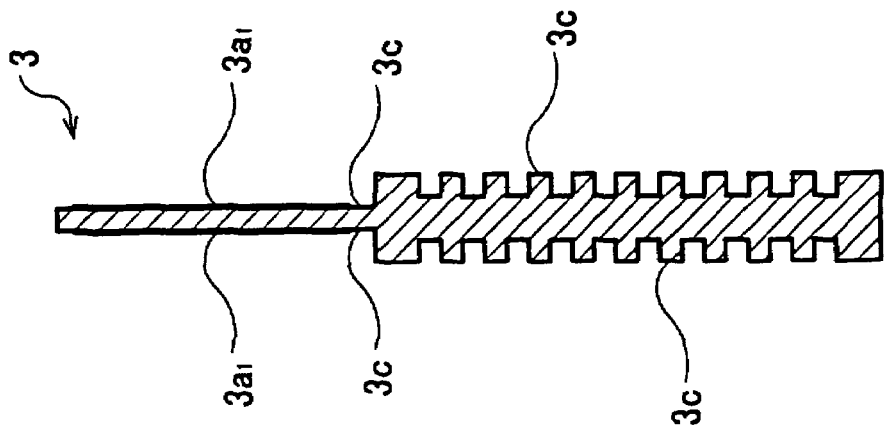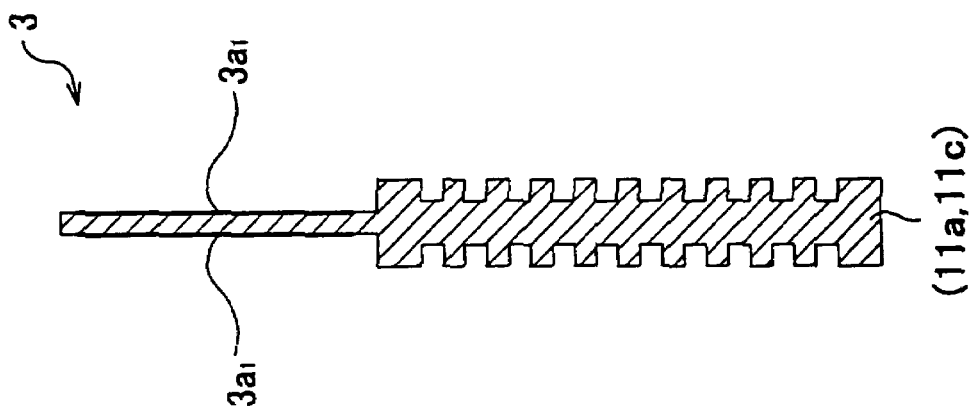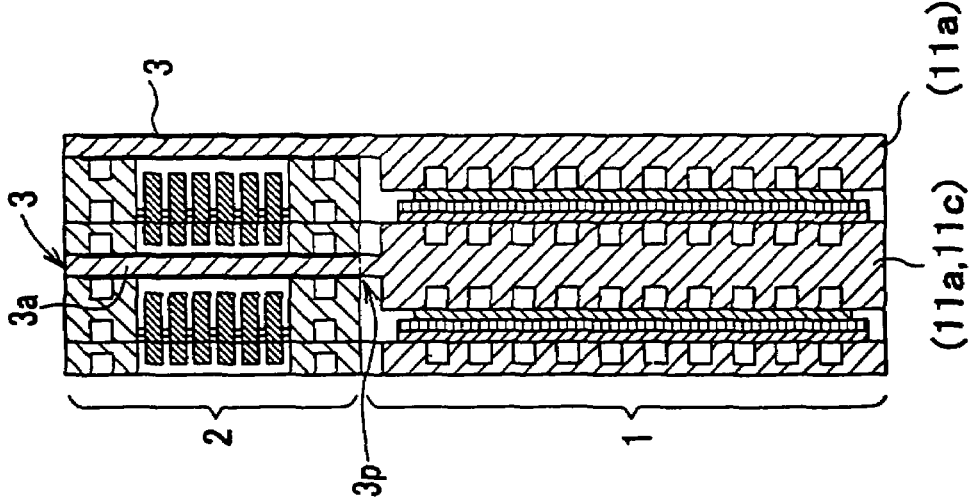

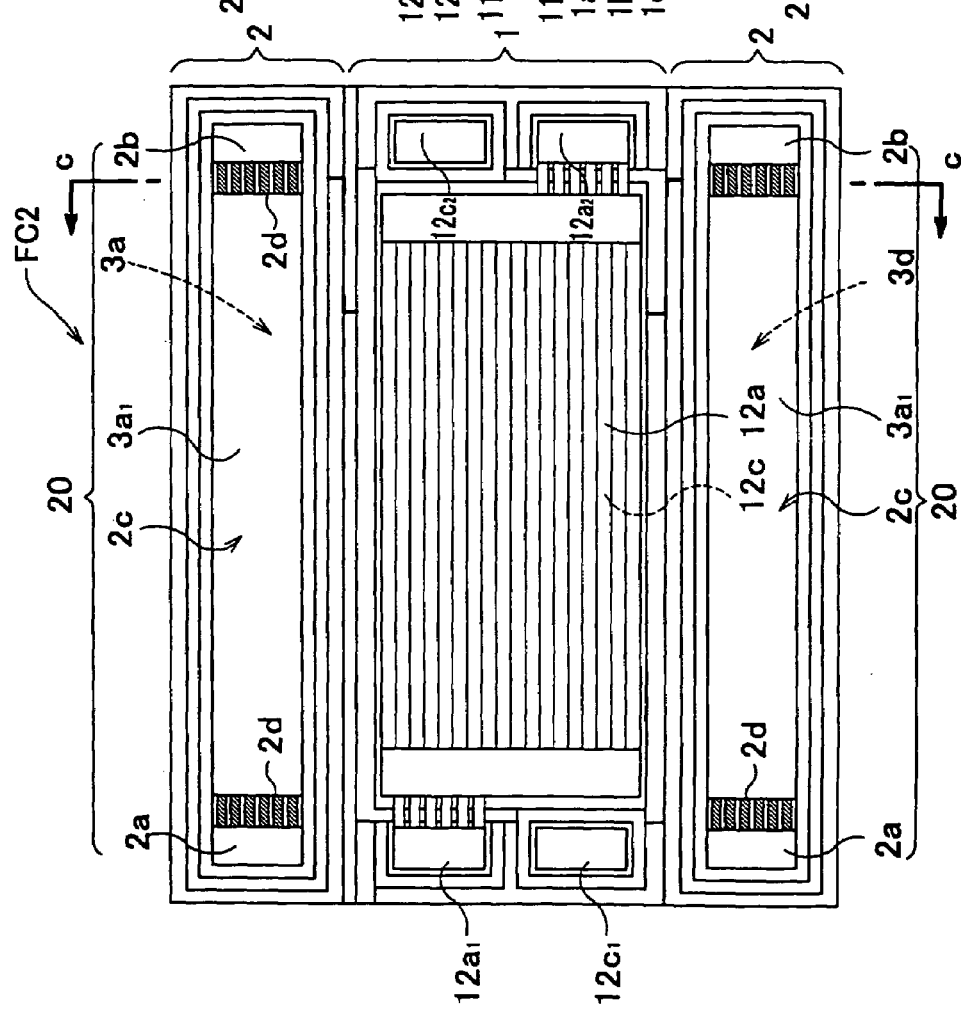

FUEL CELL AND A TEMPERATURE CONTROL SYSTEM FOR THE FUEL CELL

FIELD OF THE INVENTION

This invention relates to a fuel cell and a temperature control system and particularly to a fuel cell with a temperature control using a heat plate and a temperature control system for the fuel cell.

BACKGROUND OF THE INVENTION

Fuel cells having a membrane electrode assembly for generating an electric power from a fuel and an oxidizer are known. FIG. 11A shows such a related art fuel cell 50. The fuel cell 50 includes a polymer electrolytic membrane (PEM film) 52b having a proton conductivity, a cathode electrode 52a defined on one side of the polymer electrolytic membrane, and an anode electrode 52c defined on the opposite side, to form a membrane electrode assembly (MEA) 52. Electrochemical reaction between oxygen in the air supplied to the cathode electrode 52a and hydrogen in the fuel gas supplied to an anode electrode 52c generates an electric power. The fuel cell 50 is formed by laminating or stacking a plurality of unit cells 51, each generating a unit of electric power.

The fuel cell 50 comprises, as shown in FIG. 11B, an inlet 53a and an outlet $53a_1$, of hydrogen gas, an inlet 53b and an outlet $53b_1$, of the air, and an inlet 55b and an outlet $55b_1$, of cooling water.

FIG. 11C shows a related art cooling system for the fuel cell 50 in which cooling water is circulated. The cooling system comprises a radiator 54 as a heat exchanger, a cooling water passage 55, a pump 56 for circulating the cooling water, and a thermostat valve 57 for circulating the cooling water toward a bypass passage 55a to bypass around the radiator 54 on cooling.

The cooling water circulates through the cooling water passage 55 by the pump 56, enters the fuel cell 50 at the cooling water inlet 55b, passes through the inside of the fuel cell 50, and exits at the cooling water outlet $55b_1$ into the cooling water passage 55. During this, the cooling water, as shown in FIG. 11A, passes through the grooves 51c formed in separators 51a and 51b.

To avoid the shunt current through the fuel cell 50, a mixture of ethylene glycol having a high electric insulation and pure water or the like is used as the cooling water. Further, to absorb ions generated in the cooling water due to thermal degradation accompanied with the operation of the fuel cell 50, as shown in FIG. 11C, an ion exchanger 58 is generally provided in the cooling water passage 55.

In this fuel cell 50, the cooling water may leak in a membrane electrode assembly (MEA) 52 in the fuel cell 50 because the cooling water directly circulating through the fuel cell may cause a trouble or a power generation loss.

Further, to avoid the shunt current through the fuel cell 50, the performance of the ion exchange must be maintained, which requires a periodical exchanging the ion exchange resin in the ion exchanger 58. Thus, in the fuel cell 50 shown in FIG. 11A, there is a problem that the fuel cell 50 cannot use an electrical conductive coolant (long life coolant), which has been used in the vehicle using an internal combustion engine.

Further, the cooling water including ethylene glycol or the like has a tendency that the viscosity extremely increases at a low temperature of the fuel cell 50. Thus, there is a problem that the pump 56 receives a high load at a low temperature and thus, the efficiency becomes low because the pump 56 should force the coolant having a high viscosity to flow through the narrow grooves 51c in the separators 51a and 51b.

On the other hand, in the field of art of the fuel cell, a technique for cooling the fuel cell using a heat pipe is known. In the heat pipe, a working liquid is enclosed as a heat medium (heating medium, heat carrier) and provided between unit cells to cool the fuel cell by natural circulation. Further, a heater is provided separately from the heat pipe to heat the fuel cell (warm-up operation).

Japanese Laid open patent application No. 5-121083 discloses a fuel cell having a heat pipe sandwiched between unit cells within the cell to uniform the heat distribution in the cell.

Japanese Laid open patent application No. 11-214017 discloses a fuel cell having a heat pipe unit laminated between unit cells and extending from the laminated part to be exposed to the external.

However, the fuel cells disclosed in these documents are cooled by natural circulation of the working liquids in the heat pipes, so that an effective cooling or an effective warm-up operation cannot be provided.

SUMMARY OF THE INVENTION

According to the present invention, a first aspect of the present invention provides a fuel cell capable of using an electrically conductive coolant.

According to the present invention, a second aspect of the present invention provides a fuel cell with the improvement in decrease in efficiency of a pump at a low temperature.

According to the present invention, a third aspect of the present invention provides a temperature control system for adaptively controlling the temperature of the fuel cell.

According to the present invention, a fourth aspect of the present invention provides a temperature control system with an effective warm-up operation.

According to the present invention, a fifth aspect of the present invention provides a fuel cell comprising: an electric power generation section including a plurality of unit cells laminated in a lamination direction, each including separators and an electric power generating element which are laminated in said lamination direction; a heat medium passage separated from said electric power generation section for allowing a fluidic heat medium to flow therethrough; at least a heat plate between for exchanging heat between said separators and at least one of said heat medium passage and a heat medium in said heat medium passage, wherein said heat plate is connected to said separators to provide an electrical conduction in said lamination direction; and an electrical insulator for insulation between said heat medium in said heat medium passage and said heat plate.

This structure eliminates the necessity of the flow of the heat medium in the electric power generation section and thus prevents the leak of the heat medium in the electric power generation section. In other words, an electrical conductive coolant can be used as the heat medium. Further, if an ion exchanger is used, this structure may eliminate the periodic replacement of the ion exchange membrane or extends the replacement period.

This structure provides an electrical conduction between the separators through the heating plate in the lamination direction. The heat plate exchanges heat with at least one of the heat medium passage and a heat medium in the heat medium passage. Further, the electrical insulator provides electrical insulation between the heat plate and the heat medium. This prevents an electric power generation loss due to electrical leakage in the electrical power generation section.

The electric power generation section may be of the solid polymer electrolyte of fuel cells. However, other types of fuel cells may be used.

The heat plate and at least one of the separators adjacent to the heat plate may be connected to have one body. This structure can increase the electrical conductivity and heat exchange efficiency.

According to the present invention, a sixth aspect of the present invention provides a temperature control system comprising: a fuel cell comprising: an electric power generation section including a plurality of unit cells laminated in a lamination direction, each including separators and an electric power generating element which are laminated in said lamination direction; a heat medium passage separated from said electric power generation section for allowing a fluidic heat medium to flow therethrough; at least a heat plate between for exchanging heat between said separators and at least one of said heat medium passage and a heat medium in said heat medium passage, wherein said heat pate is connected to said separators to provide an electrical conduction in said lamination direction; and an electrical insulator for insulation between said heat medium in said heat medium passage and said heat plate; a burner for burning fuel using off gas exhausted from the electric power generation section or a crude fuel to generate combustion gas; heating means for heating the heat medium with heat of the combustion gas; supplying means for supplying the heat medium heated by the heating means to the heat medium passage; and control means for controlling an amount of the heat medium supplied from the supplying means to the heat medium passage on the basis of a temperature of the electric power generation section.

According to this structure, the heat medium may be heated with a high temperature combustion gas. The control means may control an amount of the heat medium supplied from the supplying means to the heat medium passage on the basis of a temperature of the electric power generation section. Thus, the heated heat medium may be supplied to the heat medium passage to heat the separator at the electric power generation section to provide a high efficient warm-up operation.

According to the present invention, a seventh aspect of the present invention provides a temperature control system comprising: a fuel cell comprising: an electric power generation section including a plurality of unit cells laminated in a lamination direction, each including separators and an electric power generating element which are laminated in said lamination direction; a heat medium passage separated from said electric power generation section for allowing a fluidic heat medium to flow therethrough; at least a heat plate between for exchanging heat between said separators and at least one of said heat medium passage and a heat medium in said heat medium passage, wherein said heat plate is connected to said separators to provide an electrical conduction in said lamination direction; and an electrical insulator for insulation between said heat medium in said heat medium passage and said heat plate; a first passage, allowing a fluidic heat medium to flow, connectable to the heat medium passage in the heat medium section, for heating and cooling the electric power generation section; a second passage, independent from the first fluidic passage, allowing the heat medium to flow, connectable to the heat medium passage in the heat medium section, for heating and cooling the electric power generation section; and connection control means for selectively connecting at least one of the first fluidic passage and the second fluidic passage.

According to this structure, first and second passages may be used selectively or at the same time. Thus, the preferable cooling and heating may be effected in accordance with the temperature of the electric power generation section.

BRIEF DESCRIPTION OF THE DRAWINGS

The object and features of the present invention will become more readily apparent from the following detailed description taken in conjunction with the accompanying drawings in which:

FIG. 5A is a cross-sectional view of the fuel cell according to a modification of the present invention;

FIGS. 5B and 5C are cross-sectional views of the heat plate according to a modification of the present invention.

FIG. 8A is a front elevation cross-sectional view of a fuel cell according to the second embodiment of the present invention;

FIG. 8B is a cross-sectional view, taken along the line c-c in FIG. 8A to show two adjacent unit cells;

The same or corresponding elements or parts are designated with like references throughout the drawings.

DETAILED DESCRIPTION OF THE INVENTION

First Embodiment

Hereinbelow will be described a first embodiment of the present invention with reference to accompanied drawings.

Figure 1:
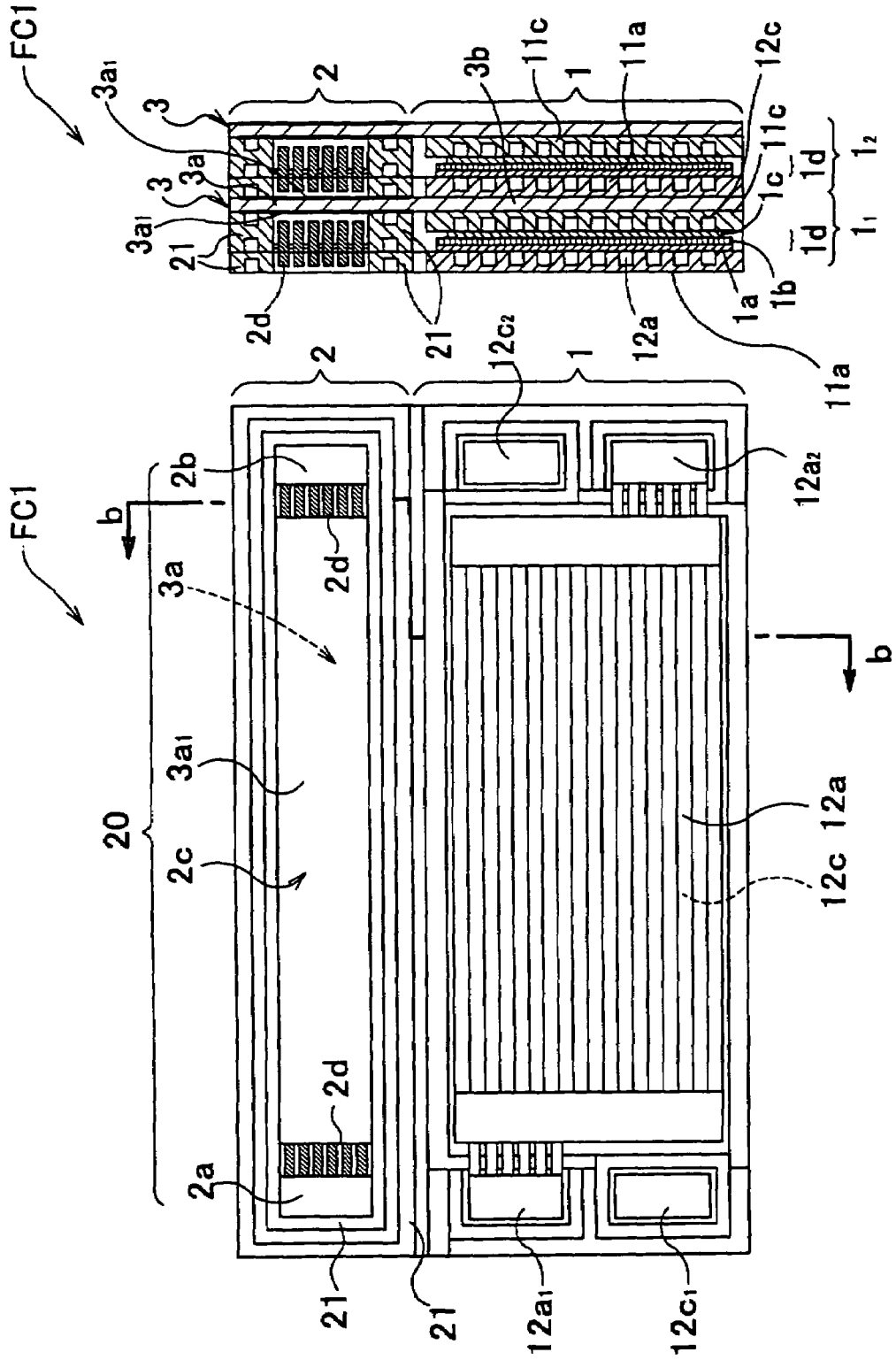
FIG. 1A is a front elevation cross-sectional view of a fuel cell according to a first embodiment of the present invention.
FIG. 1B is a cross-sectional view, taken along the line b-b in FIG. 1A to show two adjacent unit cells.

FIG. 1A is a front elevation cross-sectional view of a fuel cell according to the first embodiment of the present invention schematically illustrating the inside structure of the fuel cell. FIG. 1B is a cross-sectional view, taken along the line b-b in FIG. 1A to show two adjacent unit cells.

Figure 2:
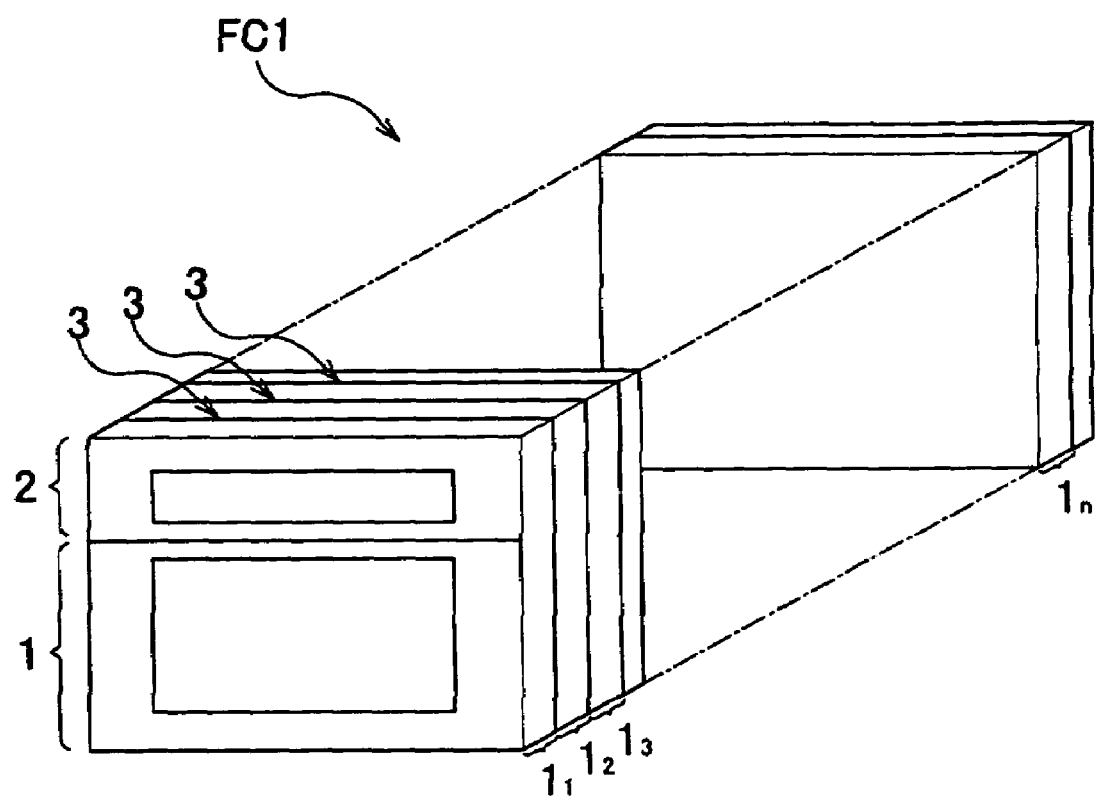
FIG. 2 is a perspective view of the fuel cell according to the first embodiment of the present invention.

As shown in FIGS. 1A and 1B, the fuel cell FC1 comprises an electric power generation section 1, a heat medium section 2 separately arranged from the electric power generation section 1 on the top of the electric power generation section 1 (in the drawing), and a heat plate 3 for heat-exchanging between the electric power generation section 1 and the heat medium section 2. Further, the fuel cell FC1 according to the embodiment has a lamination structure as shown in FIG. 2, wherein a plurality of unit cells $1_1$, $1_2$, $1_3$ - - - , and $1_n$ are laminated in a lamination direction, each unit cell including the electric power generation section 1, the heat medium section 2, and the heat plate 3, laminated in the lamination direction. This fuel cell FC1 may be mounted under a floor or the like, of a vehicle (fuel cell automobile).

As shown in FIG. 1B, the unit cell $1_1$ of the electric power generation section 1 is divided into a cathode electrode side (oxygen electrode side) and an anode electrode side (hydrogen electrode side) by an electrolytic membrane 1b. On both sides, for example, electrodes including a catalyst of platinum or the like are formed to provide a cathode electrode 1a and an anode electrode 1c, respectively, to have a membrane electrode structure (MEA electric power generation element) 1d.

The electrolytic membrane 1b comprises a solid polymer membrane such as a perfluorocabon sulfuric acid membrane, which is a proton exchange membrane. The electrolytic membrane 1b has a lot of proton exchange groups. Thus, the electrolytic membrane 1b made to contain water at a saturated level shows a low resistivity equal to or lower than 20 Ω to function as a proton conductive electrolyte.

Outside the cathode electrode 1a of the membrane electrode assembly 1d, a separator 11a is provided. Outside the anode electrode 1c on the other side, a separator 11c is provided. The separator 11a comprises oxygen supplying channels 12a allowing the supply air as an oxidizer gas to flow therethrough to supply the air to the cathode electrode 1a. The separator 11c comprises hydrogen supplying channels 12c allowing the supply air as a fuel gas to flow therethrough to supply hydrogen (crude fuel) to the anode electrode 1c.

As shown in FIG. 1A, at the both sides of the electric power generation section 1 (in the drawing of FIG. 1A), there is provided an intake channel $12a_1$ and an exhaust channel $12a_2$, for the oxygen supplying channels 12a and as well as an intake channel $12c_1$ and an exhaust channel $12c_2$, for the hydrogen supply channels 12c. The intake channel $12a_1$ and an exhaust channel $12a_2$, for the oxygen supplying channel 12a are coupled to an air supply unit (not shown). The intake channel $12c_1$ and the exhaust channel $12c_2$, for the hydrogen supply channel 12c are coupled to a hydrogen supply unit (not shown).

In this electric power generation section 1, supplying the air to the oxygen supply channel 12a and supplying the hydrogen to the hydrogen supply channel 12c generates protons at the anode 1c through the ionization of hydrogen by a catalytic reaction. The generated protons move through the electrolytic membrane 1b and reach the cathode electrode 1a. The protons arriving at the cathode 1a react with oxygen in the supply air to generate water. The supply air consumed in the electrochemical reaction includes the generated water and unused air which is exhausted at an outlet (not shown) as exhaust air on the side of the cathode in the electric power generation section 1. At the anode electrode 1c, electrons e are generated during ionization of hydrogen and supplied to an external load such as a motor (not shown) and returns to the cathode electrode 1a.

The heat medium section 2, as shown in FIG. 1A, comprises a heat medium passage 20 including an intake channel 2a and an exhaust channel 2b, and a heat exchange channel 2c. All inside walls including the upper and bottom inside walls (in the drawing) of the heat medium passage 20 are covered with an insulation member 21. The insulation member 21 comprises, for example, thermosetting resin such as phenol or thermoplastic resin such as PPS resin.

At the coupling openings between the intake channels 2a and the heat exchange channel 2c and the coupling openings between the exhaust channels 2b and the heat exchange channel 2c, a plurality of straightening vanes 2d are arranged vertically (in the drawing), each being spaced to straighten the flow of the cooling water as a heat medium.

Figure 3:
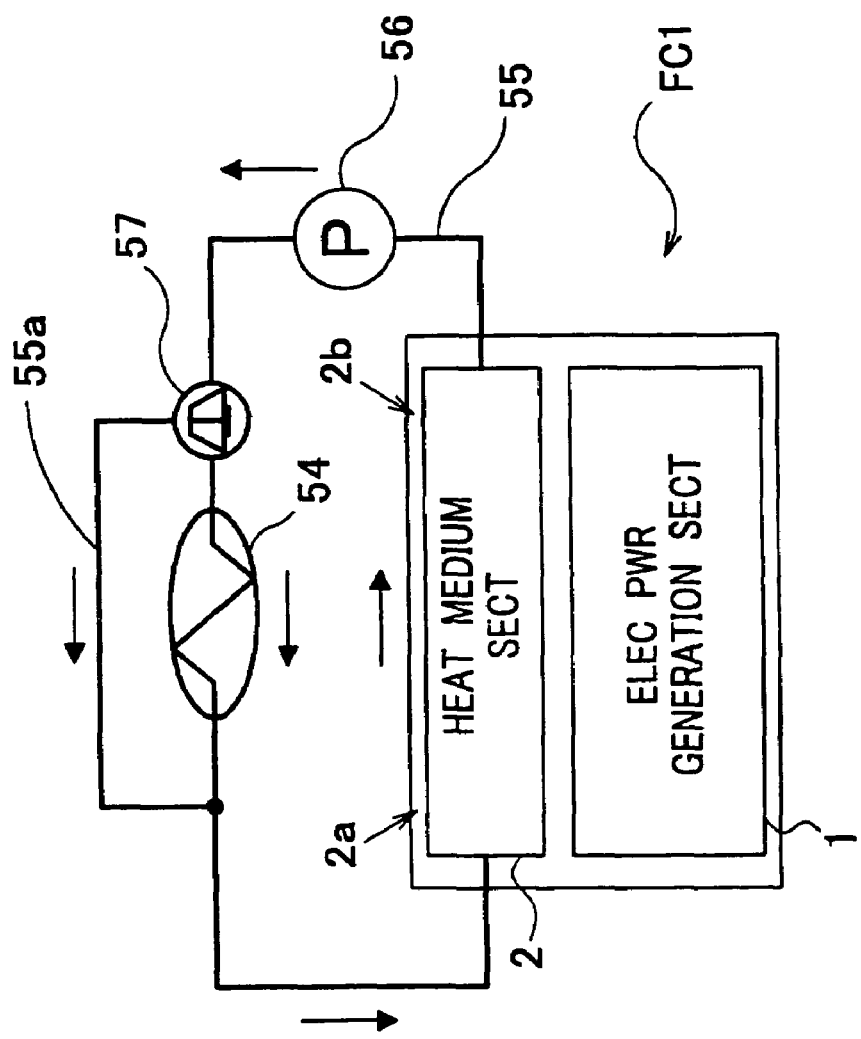
FIG. 3 is an illustration of a temperature control system for the fuel cell according to the present invention.

To the intake channel 2a and the exhaust channel 2b of the heat medium passage 20, as shown in FIG. 3, a cooling water passage 55 is connected to circulate the cooling water. The cooling system comprises a radiator 54 as a heat exchanger, a pump 56 for forcibly circulating the cooling water, and a thermostat valve 57 toward the bypass passage 55a to bypass around the radiator 54. The cooling water circulated in the cooling system may be pure water having a high insulation resistance, or a mixture of ethylene glycol and pure water. However, a coolant with an electrically conductivity, which is widely used in the general internal combustion engine, can be used also.

As shown in FIG. 1B, the heat plate 3 comprises a plate having a high electrical conductivity and a high heat conductivity such as a carbon member or a metal member, and extends from the electric power generation section 1 to the heat medium section 2 to provide heat exchange therebetween.

The connection structure between the heat plate 3 and the unit cell $1_1$ of the electric power generation section 1 will be described.

The lower part 3b of the heat plate 3 is connected to the side surface of the separator 11c with a contact to provide electrically conductivity in the lamination direction of the electrical power generation section 1 and the heat plate 3. Thus, the heat plate 3 is sandwiched between the separator 11c of the unit cell $1_1$ and the separator 11a of the neighbor unit cell $1_2$ to provide an electrical conduction therebetween in the lamination direction. The heat plate 3 extends to the heat medium passage 20 and further extends to the upper wall of the heat medium passage 20 to have side surfaces of the upper part 3a of the heat plate 3 within the space of the heat exchange channel 2c. The side surfaces of the upper part 3a are covered with insulation films $3a_1$ to electrically insulate the heat plate 3 from the cooling water flowing through the heat exchange channel 2c. The insulation film $3a_1$ comprises a polyamide film formed on the side surface 3a. In this embodiment, the upper part 3a of the heat plate 3 is directly connected to the heat exchange channel 2c through the insulation film $3a_1$. However, the heat plate 3 may be thermally coupled to the heat exchange channel 2c through another heat conductive member.

According to the fuel cell FC1 as described above, the electric power generation section 1 and the heat medium passage 20 allowing the cooling water to flow therethrough to cool or warm up the electrical power generation section 1 are separately formed from each other. Thus, the electrical power generation section 1 can be cooled without the flow of the cooling water in the electrical power generation section 1. The heat plate 3 has a relatively high heat conductivity to carry the heat generated during the electric power generation of the fuel cell FC1 to the cooling water at a high efficiency. This structure eliminates the possibility of leakage of the cooling water in the electric power generation section 1 and does not cause a trouble or a power generation loss due to leakage though the conductive coolant (earlier mentioned) is used. Insulation of the heat plate 3 from the cooling water eliminates the necessity of the ion exchanger. This provides a preferable structure as the system. Alternatively, if pure water is used as the cooling water, the periodical replacement of the ion exchange resin (not shown) is unnecessary. Further, the interval of replacement can be extended. Further, since the cooling water does not flow through the electric power generation section 1, the efficiency of the pump is kept high during cooling.

The heat plate 3 at the lower part 3b is connected to the separator 11c (11a) in the lamination direction of the separator 11c, and the upper part of the heat plate 3 is thermally coupled to the cooling water flowing through the heat exchange channel 2c, so that the separators 11c and 11a in the electric power generation section 1 can be cooled by the cooling water flowing through the heat exchange channel 2c. This controls the temperature of the electric power generation section.

Further, the heat plate 3 at the lower part 3b is electrically connected to the separators 11a and 11c in the direction of lamination of the heat plate 3 and the separators 11a and 11c, providing an electrical conduction between the adjacent unit cells. Accordingly, the unit cells $1_1$, $1_2$, $1_3$, - - -, and $1_n$ are connected in series in the direction of lamination.

Further, the surface of the heat plate 3 at the upper part 3a exposed to the space of the heat exchange channel 2c is covered with the insulation film $3a_1$, which provides electrical insulation from the cooling water and thus prevents a power generation loss due to leakage.

The electric power generation section 1 is generally of the solid polymer electrolyte fuel cells. However, another type of electric power generation section can be used also.

Figure 4C:
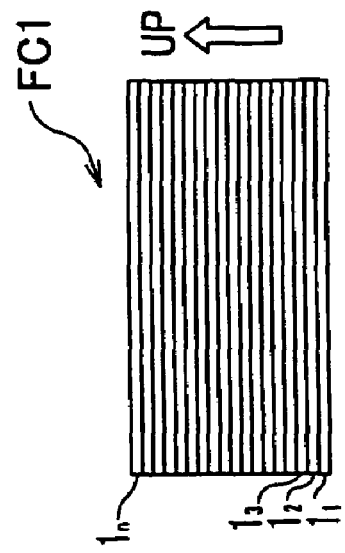
FIG. 4C is a front view of the electric power generation section after lamination according to a modification of the present invention.
Figure 4B:
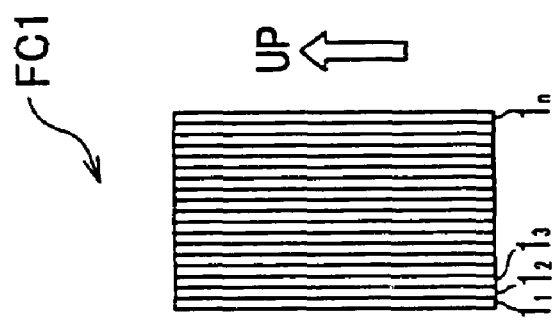
FIG. 4B is a front view of the electric power generation section after lamination according to the first embodiment.
Figure 4A:
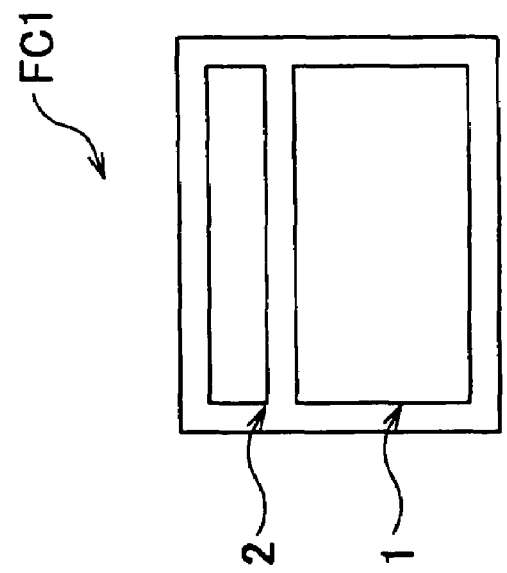
FIG. 4A is a side elevation view of the fuel cell according to the first embodiment.

In the present embodiment, the unit cells $1_1$, $1_2$, $1_3$, - - -, and $1_n$ vertically positioned are, as shown in FIG. 4B, laminated in the horizontal direction and placed in the electric power generation section 1 shown in FIG. 4A. However, as shown in FIG. 4C, the unit cells $1_1$, $1_2$, $1_3$, - - -, and $1_n$ may be stacked in the vertical direction (in the drawing).

Further, as shown in FIGS. 5A and 5B, either of separator 11a or the separator 11c or both may be formed integrally with the heat plate 3. This integral structure of the heat plate 3 provides surely high electrical and heat conductivities. Further, this structure can decrease the number of parts, the man-hour or machine-hour, and the management cost in manufacturing.

Further, as shown in FIG. 5C, the heat plate 3 may have high electrical and/or heat conductivity only at its surface 3c.

Next, a temperature control system using the above-described fuel cell FC1 will be described.

Figure 6:
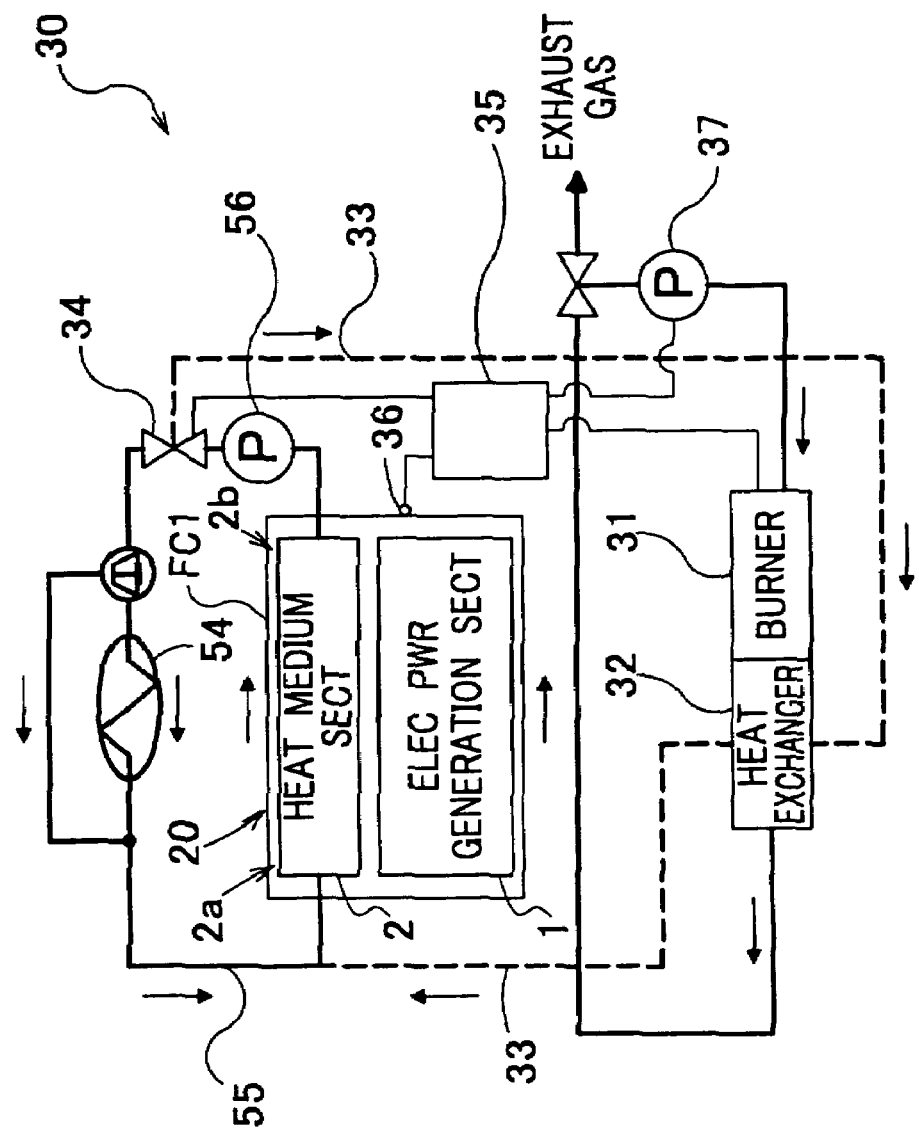
FIG. 6 is an illustration describing a temperature control system for the fuel cell according to the first embodiment of the present invention.

FIG. 6 is an illustration for describing the temperature control system including the fuel cell FC1.

In FIG. 6, the temperature control system 30 comprises the fuel cell FC1, the cooling system, a burner 31, a heat exchanger 32 as a heating element, supply pipes 33, a switching valve 34, and a control section 35 as a control element.

The burner 31, burning hydrogen to generate a combustion gas, is supplied with hydrogen from the exhaust gas from the electric power generation section 1 or through a supply pipe (not shown) branched off from the hydrogen supply passage $12c_1$ (refer to FIG. 1A).

The heat exchanger 32 heats the cooling water as a heat medium using the heat of the combustion gas generated by the burner 31. Here, for the combustion, a fuel gas, the exhaust gas from the anode, or a special fuel can be used.

The supply pipe 33 is provided to couple the heat exchanger 32 with the cooling water passage 55 of the cooling system. For example, during the warm-up operation, the supply pipe 33 forms a circular system in which the cooling water heated by the heat exchanger 32 is supplied to the intake side of the heat medium passage 20 (the side of the intake channel 2a) and returned via the exhaust side 2b of the heat medium passage 20 of the heat medium section 2 and the switching valve 34 to the heat exchanger 32.

The switching valve 34 is provided at the exhaust side of the pump 56 in the cooling system to return the cooling water exhausted at the outlet of the pump 56 of the cooling system to return the cooling water to the supply pipe 33.

The control section 35 controls the amount of the heated cooling water supplied from the supply pipe 33 on the basis of the temperature of the electric power generation section 1 and integrally control the temperature system 30.

Figure 7:
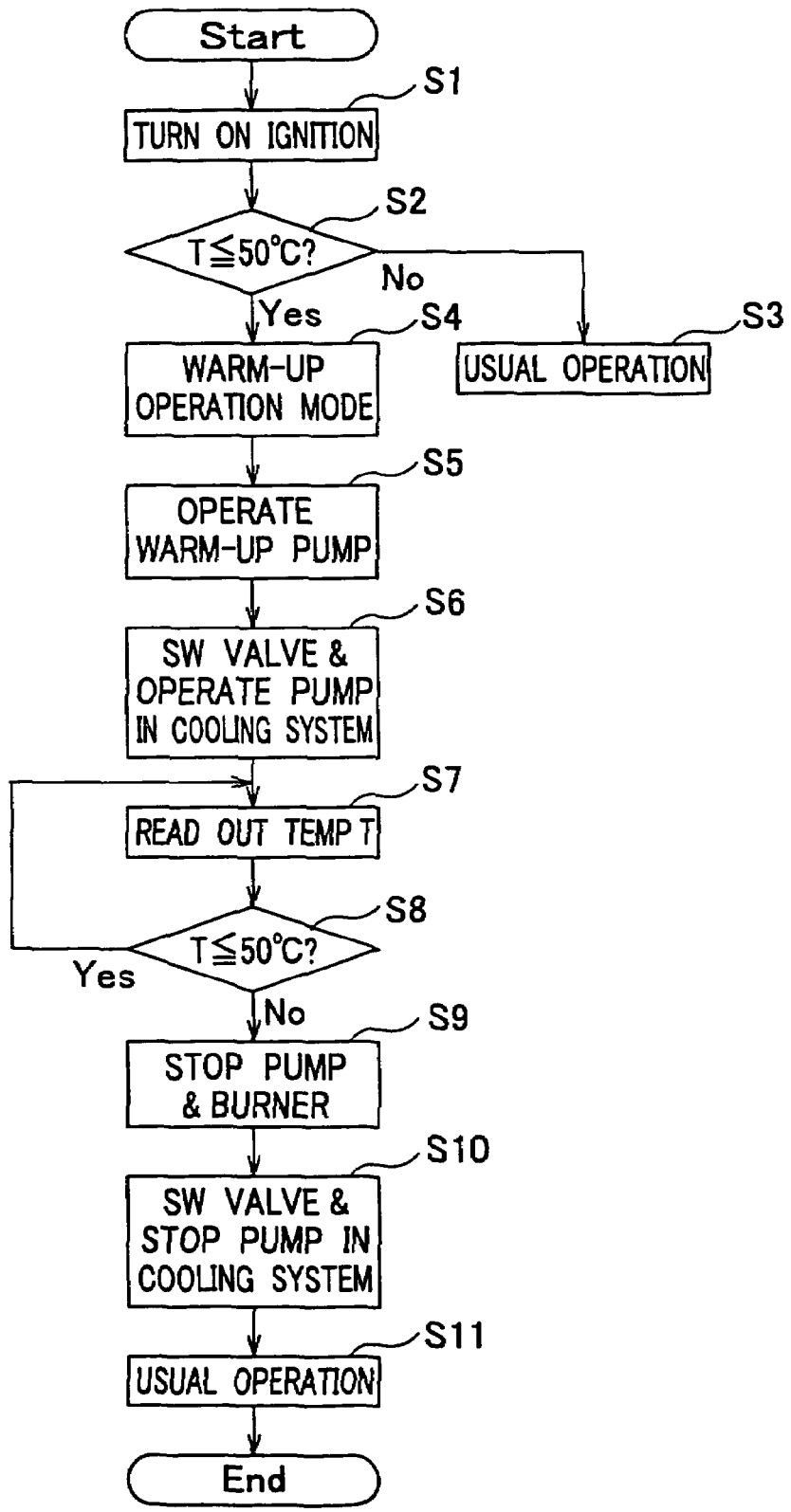
FIG. 7 depicts a flow chart describing a temperature control according to the present invention.

Next, the operation of the temperature control system 30 will be described with reference to FIG. 7, including FIGS. 1A, 1B, and 6. FIG. 7 is a flow chart describing the control operation in the temperature control system 30.

An ignition switch of a fuel cell electric car (not shown) is turned on to start up the car in step S1. Then, the temperature T of the exhaust gas (the temperature of the electric power generation section) at the exhaust side of the fuel cell FC1 is detected by the sensor 36 shown in FIG. 6. In step S2, it is judged whether the warm-up operation is required. For example, the temperature is compared with a reference temperature of 50° C. If the temperature is equal to or lower than 50° C., the warm-up operation is judged to be necessary.

If the temperature T of the exhaust gas exceeds 50° C. (No), the warm-up operation is judged to be unnecessary and thus, the processing proceeds to step S3 executing the usual operation.

If the temperature T of the exhaust gas is equal to or lower than 50° C. (Yes), the warm-up operation is judged to be necessary and thus, the processing proceeds to step S4 to execute the warm-up operation.

In the warm-up operation, the pump 37 is operated to supply hydrogen to the burner 31 in step S5. In the following step S6, the switching valve 34 is switched and operates the pump 56 in the cooling system to supply the cooling water to the side of the heat exchanger 32 through the supply pipe 33. The cooling water is heated at the heat exchanger 32 and the heated cooling water is supplied through the supply pipe 33 to the heat medium passage 20, where the electric power generation section 1 is heated through the heat plate 3.

The temperature T of the exhaust air at the exhaust side of the fuel cell FC1 is read out again in step S7, and it is judged whether the warm-up operation is continued in step S8. If the temperature T of the exhaust gas is equal to or lower than 50° C. (Yes), the warm-up operation is judged to be further necessary, and processing returns to step S7 to continue the warm-up operation.

On the other hand, if the temperature T of the exhaust gas exceeds 50° C. (No), the warm-up operation is judged to be sufficient, and thus the pump 37 and burner 31 are stopped in step S9. In the following step S10, the switching valve 34 is switched and the pump 56 in the cooling system is stopped. Then, the processing proceeds to step S11 to execute the usual operation mode.

According to the temperature control system 30 described above, combustion can be provided at the burner 31 with the exhaust gas exhausted at the electric power generation section 1 or crude fuel of hydrogen and the air. The cooling water is heated using the heat of the high temperature combustion gas generated by the burner 31. This structure can heat the cooling water at a high efficiency. The heated cooling water is supplied to the heat medium passage 20 at a suitable amount by the control of the control section 35 to execute a suitable warm-up operation, providing a suitable operation condition of the fuel cell FC1.

Second Embodiment

A fuel cell according to a second embodiment will be described with reference to FIGS. 8A to 10, wherein the corresponding parts or elements to those in the first embodiment are designated with the like references, and thus, the description for these parts or element is omitted. FIG. 8A is a front elevation cross-sectional view of the fuel cell FC2 and FIG. 8B is a sectional view, taken along line c-c in FIG. 8A.

The fuel cell FC2 according to the second embodiment further comprises a heat medium section 2 under the electric power generation section 1, and the heat plate 3 extends to the lower heat medium section 2. In other words, the electric power generation section 1 is sandwiched between the upper heat medium section 2 and the lower heat medium section 2.

Respective parts of the under heat medium section 2 are arranged at symmetrical positions, respectively, with respect to the electric power generation section 1. The extended part of the heat plate 3 at the extended part 3d is exposed to the space of the under heat exchange channel 2c and is covered with an insulation film $3a_1$.

In the fuel cell FC 2, the heat medium section 2 under the electric power generation section 1 further controls the temperature of the electric power generation section 1 with the cooling water flowing through the heat medium section 2. That is, the separator 11c (11a) in the electric power generation section 1 can be cooled by the heat exchange channels 2c at the same time, so that an efficient cooing operation is provided.

Figure 9C:
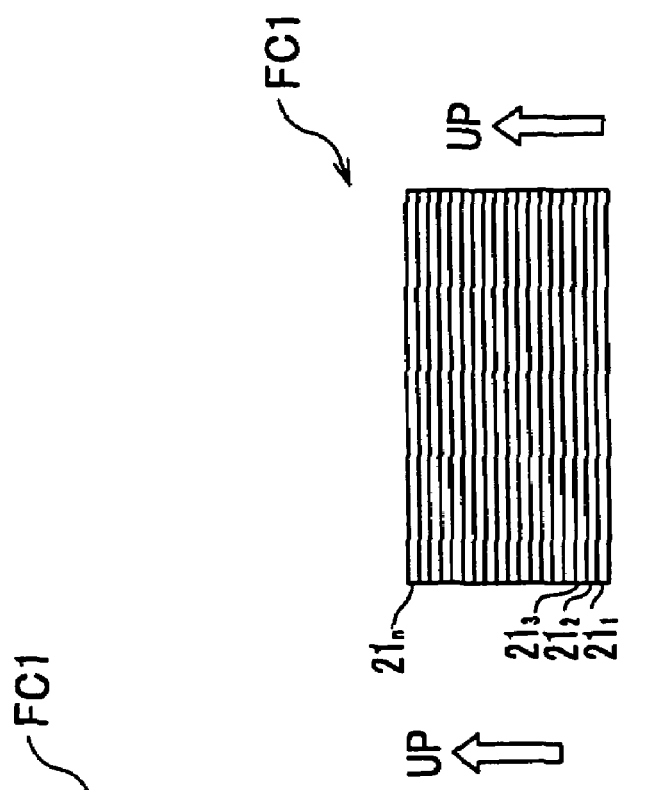
FIG. 9C is a front view of the electric power generation section after lamination according to a modification of the present invention.
Figure 9B:
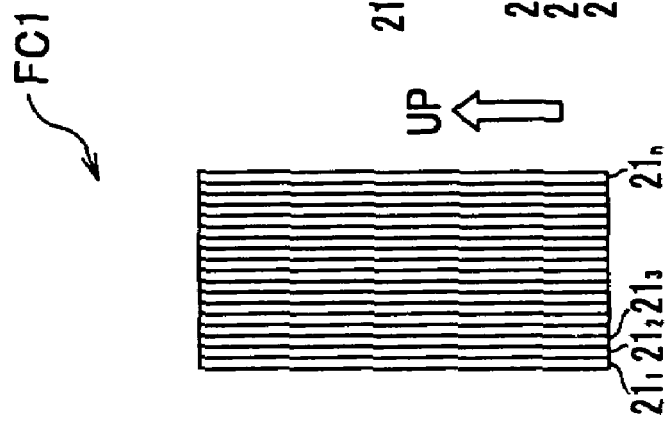
FIG. 9B is a front view of the electric power generation section after lamination according to the second embodiment.
Figure 9A:
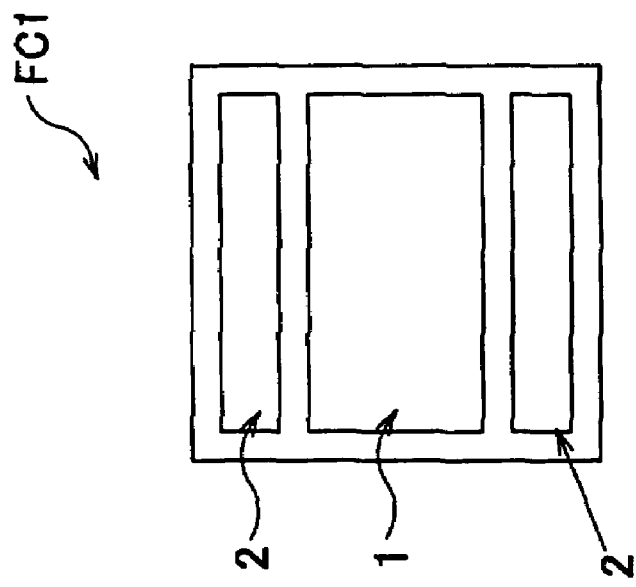
FIG. 9A is a side elevation view of the fuel cell according to the second embodiment.

Further in the present embodiment, the unit cells $21_1$, $21_2$, $21_3$, - - -, and $21_n$ are positioned vertically as shown in FIG. 9B, and laminated in the horizontal direction, and then placed in the electric power generation section 1 shown in FIG. 9A. However, the unit cells $21_1$, $21_2$, $21_3$, - - -, and $21_n$ may be stacked in the vertical direction (in the drawing of FIG. 9C).

Next, a temperature control system using the above-described fuel cell FC2 will be described.

Figure 10:
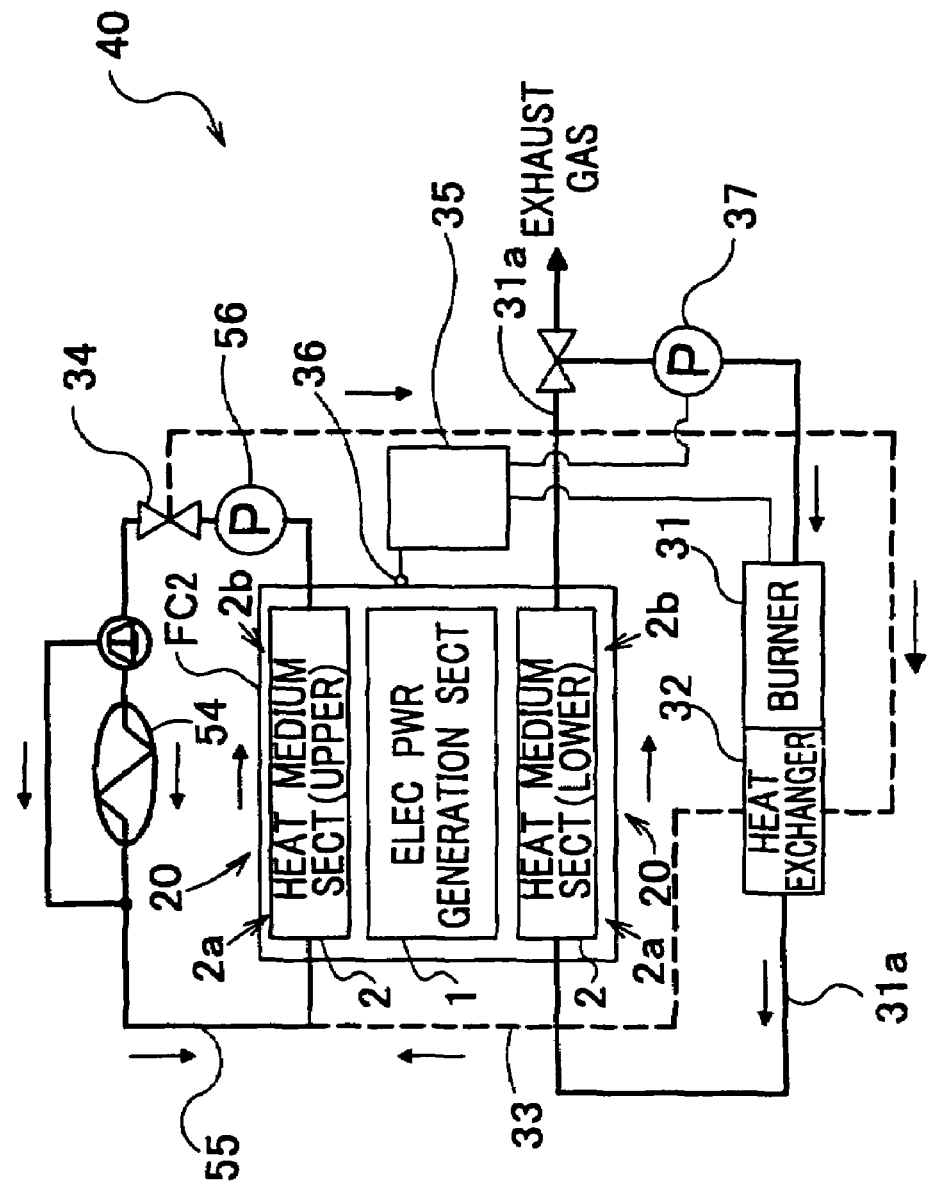
FIG. 10 is an illustration of a temperature control system for the fuel cell according to the second embodiment of the present invention.
Figure 11A:
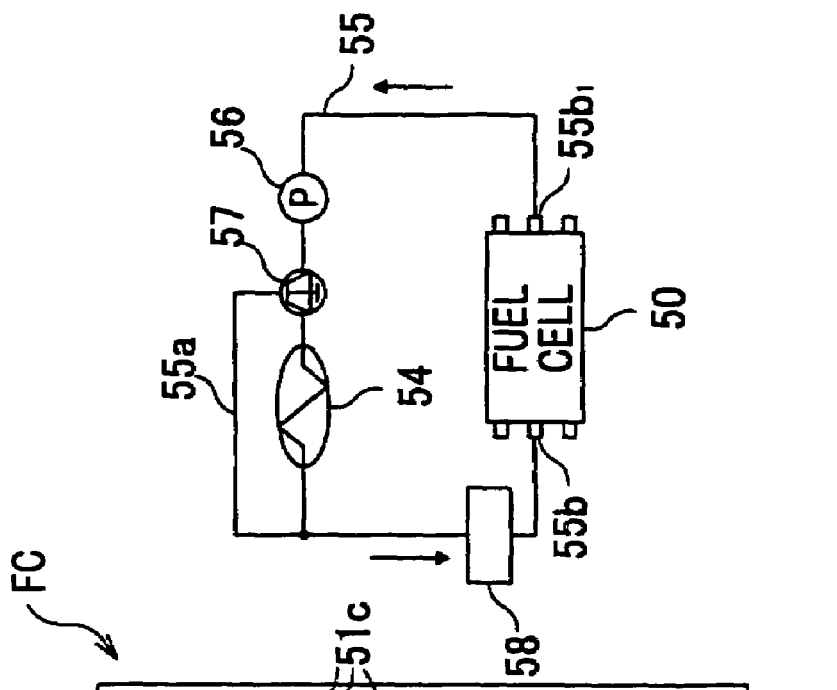
FIG. 11A is a cross-sectional view of a related art fuel cell.
Figure 11B:
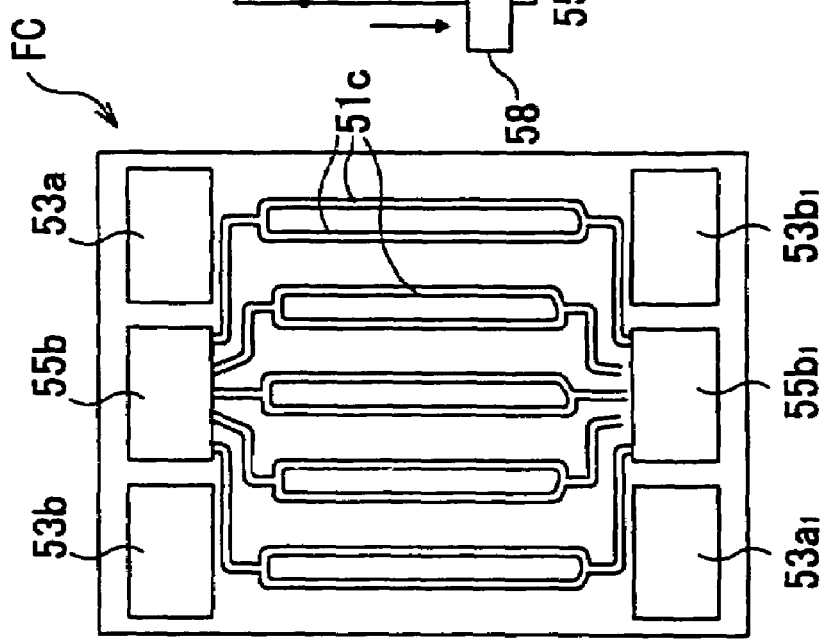
FIG. 11B is an illustration showing an internal connection of a related art fuel cell.
Figure 11C:
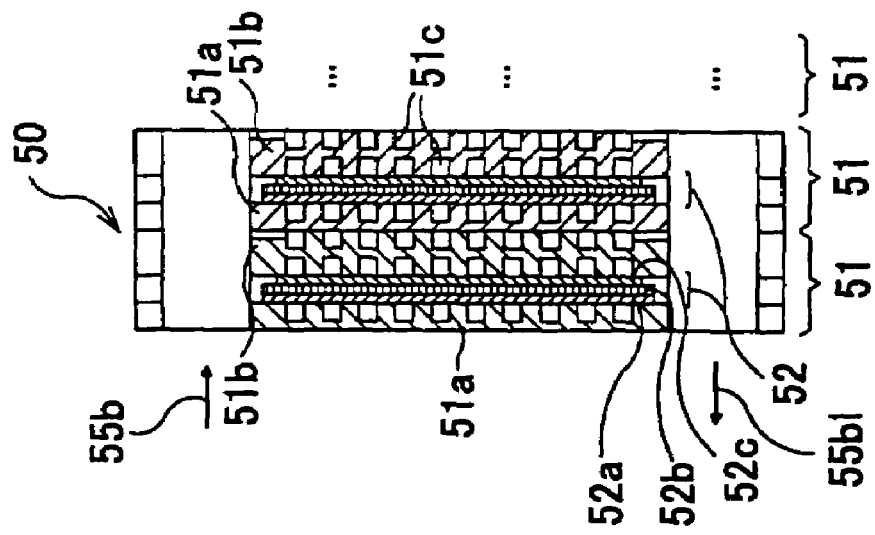
FIG. 11C is an illustration describing a related art temperature control system for a fuel cell.

FIG. 10 is an illustration for describing the temperature control system including the fuel cell FC2.

In FIG. 10, the temperature control system 40 is provided by improving the temperature control system 30 (FIG. 6) described in the first embodiment. More specifically, the temperature control system 40 for the fuel cell FC2 further comprises a supply pipe 33 supplying the cooling water passing through the heat exchanger 32 to the heat medium passage 20 at the upper part of the fuel cell FC2, and an exhaust pipe 31a introducing the combustion gas generated at the burner 31 into the heat medium passage 20 at the heat medium section 2 at the lower part of the fuel cell FC2. The control section 35 further controls the supply of the cooling water to the supply pipe 33 and the burner 31. Under the control of the control section 35, the supply pipe 33 is supplied with the cooling water and as well as the exhaust gas pipe 31a is supplied with the combustion gas generated at the burner 31. Here, the supply pipe 33 and the exhaust pipe 31a are also referred to as first and second fluid passages, respectively. Further, the control section 35 is also referred to as a control means.

The combustion gas supplied from the burner 31 is supplied to the exhaust pipe 31a and further supplied to the intake side of the heat medium passage 20 (the side of intake channel 2a) and outputted through the exhaust gas pipe 31a at the exhaust side (exhaust channel 2b).

The control section 35 can control the supply of the cooling water into the supply pipe 33 and the supply of the combustion gas to the exhaust pipe 31a. Further, during the warm-up operation the control section 35 can control the supply of the cooling water to the upper heat medium section 2 and the supply of the combustion gas to the lower heat medium section 2, respectively. Thus, the control section 35 controls the supply of the cooling water to the upper heat medium section 2 and the supply of the combustion gas to the lower heat medium section 2 individually or similarly at the same time.

Further, in the condition that the burner 31 is not operated, if the cooling water is supplied to the supply pipe 33, the heat medium passage 20 of the upper heat medium section 2 is supplied with the cooling water to cool the electric power generation section 1. In other words, the cooling with the cooling water is selectively supplied from either the cooling system including the cooling water passage 55 or the supply pipe 33. Here, differentiating the capacities between the radiator 54 and the heat exchanger 32 provides the cool system with different cooling efficiencies.

Further, in the condition that the burner 31 is not operated, supplying the air through the exhaust gas pipe 31a can operate the exhaust gas pipe 31a also for cooling.

According to the temperature control system 40, for example, in the warm-up operation, the upper heat medium section 2 above the electric power generation section 1 is supplied with the heated cooling water and as well as the heat medium section 2 under the electric power generation section 1 is supplied with the combustion gas through the exhaust gas pipe 31a. This structure provides a warm-up operation using both the heat medium sections 2 above and under the electric power generation section 1 at a high efficiency. This shortens the warm-up interval. Further, the heat of the combustion gas is further effectively used.

The use of the fuel cells FC1 and FC2 are not limited to the fuel cell electric car, but the fuel cells FC1 and FC2 are also used, for example, in home-use fuel-cell-containing devices.

As described above, according to the present invention, in the fuel cell FC1, the electric power generation section 1 includes a plurality of unit cells $1_1$-$1_n$ in a lamination direction. Each unit includes separators 11a and 11c and an electric power generating element 1d between the separators 11a and 11c which are laminated in the lamination direction. The fuel cell FC1 further comprises a heat medium section 2 separated from the electric power generation section 1 for allowing a fluidic heat medium to flow therethrough and at least a heat plate 3 between successive two of the separators for exchanging heat between the separators 11a and 11c and at least one of the heat medium section 2 and a heat medium in the heat medium section 2, wherein the heat plate 3 is connected to the successive two of the separators 11c in the unit cell $1_1$ and 11a in the insulator is formed to cover the contact surface between the heat plate and the heat medium when it is considered that the heat plate extends to the upper wall of the heat medium passage 2.

The heat medium passage 2 comprises an upper wall and a lower wall having a through hole around the part of the heat plate 3 indicated by line 3p in FIG. 5A to allow the heat plate 3 to extend into the heat medium passage 2 to the upper wall to provide a side wall (3) of the heat medium passage to define the heat medium passage. Further insulating members 21 may be arranged inwardly on the upper and lower walls, respectively, to heat insulation to provide a higher temperature control efficiency or an electrical insulation.

Further, the heat plate 3 and at least one of the separators 11a and 11c adjacent to the heat plate are connected to have one body. Thus, the numbers of parts is reduced.

In the second embodiment shown in FIGS. 8A and 8B, the heat plate 3 also extends to the lower heat medium passage 2 for exchanging heat with a heat medium in the another heat medium passage 20 of the under heat medium section 2. Thus, the heat exchanging efficiency can be improved.

In the temperature control system using the fuel cell shown in FIG. 6, the burner 31 burns fuel using off gas exhausted from the electric power generation section or a crude fuel externally supplied to generate the combustion gas. The heat exchanger 32 heats the heat medium with heat of the combustion gas from the burner 31. Thus, the warm-up operation using the heat plate 3 can be provided.

The supply pipe 33 supplies the heat medium heated by the heating exchanger 32 to the heat medium passage 2. The control section 35 controls an amount of the heat medium supplied from the supply pipe 33 to the heat medium passage 2 on the basis of a temperature of the electric power generation section 1. Further, the heat medium is supplied from the cooling water passage 55 and the supply pipe 33. The control section 35 selectively connects at least one of the cooling water passage 55 and supply pipe 33 to the heat medium passage 2. Thus, the selectively using the heat exchanging channels 2 provides an adaptive temperature control.

In the temperature control system shown in FIG. 10, the start of supplying the heat medium to the heat exchanger 32 may be delayed from the start of combustion in the burner 31 to rapidly warm up the electric power generation section 1 for a predetermined time interval with timer (not shown) in the control section 35 or in accordance with the temperature of the heat medium because the specific heat of the heat medium is higher than that of the combustion gas.

What is claimed is:

1. A fuel cell comprising:
an electric power generation section including a plurality of unit cells laminated in a lamination direction, each including separators and an electric power generating element which are laminated in said lamination direction;
a heat medium passage separated from said electric power generation section in a direction perpendicular to the lamination direction, wherein the heat medium passage is for allowing a fluidic heat medium to flow therethrough;
a heat plate for exchanging heat between said separators and said heat medium passage and a heat medium in said heat medium passage, wherein said heat plate is connected to said separators to provide electrical conduction in said lamination direction; and
an electrical insulator for insulating said heat medium in said heat medium passage from said heat plate.

2. The fuel cell as claimed in claim 1, wherein said insulator covers a contact surface between said heat plate and said heat medium in said heat medium passage.

3. The fuel cell as claimed in claim 1, wherein said heat plate defines a part of said heat medium passage and said insulator covers a contact surface between said part of said heat medium passage and said heat medium.

4. The fuel cell as claimed in claim 1, wherein said heat plate and at least one of said separators adjacent to said heat plate are connected to have one body.

5. The fuel cell as claimed in claim 1, wherein said heat medium passage comprising an upper wall and a lower wall having a through hole to allow said heat plate to extend into said heat medium passage to said upper wall to provide a side wall of said heat medium passage to define said heat medium passage.

6. The fuel cell as claimed in claim 1, further comprising insulating members on said upper and lower walls, respectively.

7. The fuel cell as claimed in claim 1, wherein said heat medium passage comprises an intake of said heat medium and a plurality of straightening vanes near an inlet of said heat medium passage arranged in a direction perpendicular to a flow direction of said heat medium in said heat medium passage for straightening a flow of said heat medium in the heat medium passage.

8. The fuel cell as claimed in claim 1, further comprising:
another heat medium passage on the opposite side of the said heat medium passage with respect to said electric power generation section, wherein said heat plate extends to said another heat medium passage for exchanging heat with at least one of said another heat medium passage and a heat medium in said another heat medium passage; and
an insulation film covering a contact surface between said heat plate and said at least one of said another heat medium passage and said heat medium in said another heat medium passage.

9. The fuel cell as claimed in claim 1, wherein said separators each comprises channels, said power electric power generation element comprises a membrane electrode assembly including cathode and anode electrodes and electrolytic membrane, and said electric power generation section further comprises an oxidizer intake and a fuel intake to supply an oxidizer and fuel to said electric power generating element to said cathode and anode electrode through said channels, respectively.

10. A fuel cell comprising:
an electric power generation section including a plurality of unit cells laminated in a lamination direction, each unit cell including separators and an electric power generating element which are laminated in said lamination direction;
a heat medium passage isolated from fluid communication with said electric power generation section;
a heat plate arranged to exchange heat between at least one of said separators and a heat medium in said heat medium passage, wherein said heat plate is connected to said separators to provide electrical conduction in said lamination direction; and
an electrical insulator adapted to provide electrical insulation between said heat medium in said heat medium passage and said heat plate.

11. The fuel cell of claim 10 wherein the heat medium passage is separated from the electric power generation section in a direction perpendicular to the lamination direction.

* * * * *